(12) United States Patent
Laronne et al.

(10) Patent No.: US 7,149,693 B2
(45) Date of Patent: Dec. 12, 2006

(54) AUTOMATED DIGITAL VOICE RECORDER TO PERSONAL INFORMATION MANAGER SYNCHRONIZATION

(75) Inventors: Shai A. Laronne, Montville, NJ (US); Stephen Teplansky, Airmont, NJ (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 550 days.

(21) Appl. No.: 10/632,029

(22) Filed: Jul. 31, 2003

(65) Prior Publication Data

US 2005/0028212 A1    Feb. 3, 2005

(51) Int. Cl.
*G10L 15/00*    (2006.01)

(52) U.S. Cl. .................. 704/270; 704/201; 700/94

(58) Field of Classification Search ............... 704/201, 704/270; 700/94
See application file for complete search history.

(56) References Cited

U.S. PATENT DOCUMENTS

| | | | |
|---|---|---|---|
| 4,150,261 A | | 4/1979 | Mason |
| 4,621,350 A | | 11/1986 | Sevitsky et al. |
| 4,839,857 A | | 6/1989 | Mersiovsky et al. |
| 5,146,439 A | | 9/1992 | Jachmann et al. |
| 5,828,730 A | | 10/1998 | Zebryk et al. |
| 6,236,468 B1 | * | 5/2001 | Otsuka et al. ............... 358/444 |
| 6,253,237 B1 | | 6/2001 | Story et al. |
| 6,549,614 B1 | | 4/2003 | Zebryk et al. |
| 6,571,211 B1 | * | 5/2003 | Dwyer et al. ............... 704/270 |
| 6,587,127 B1 | | 7/2003 | Leeke et al. |
| 6,671,567 B1 | * | 12/2003 | Dwyer et al. ................ 700/94 |
| 6,993,480 B1 | * | 1/2006 | Klayman .................... 704/226 |
| 2002/0116185 A1 | | 8/2002 | Cooper et al. |
| 2003/0050776 A1 | | 3/2003 | Blair |

FOREIGN PATENT DOCUMENTS

JP    10063473    3/1998

OTHER PUBLICATIONS

Sony Style USA Internet Catalog Sheets for Digital Voice Recorders, copyright 2002.

* cited by examiner

*Primary Examiner*—Daniel Abebe
(74) *Attorney, Agent, or Firm*—Miller Patent Services

(57) ABSTRACT

Apparatus and methods are presented for Automated Digital voice recorder to Personal information manager Synchronization. (ADPS) message creation that allow a user to indicate that an ADPS message is to be created, select and ADPS type selection relating the ADPS message to be created to a type of Personal Information Manager (PIM) application, record audio content for the ADPS message, and create an ADPS message by organizing the ADPS type selection and the audio content into the ADPS message and store the ADPS message in the memory. Apparatus and methods are presented for downloading ADPS messages directly to a target PIM application. Apparatus and methods are presented for uploading configuration modifications and informational lists to the DVR. This abstract is not to be considered limiting, since other embodiments may deviate from the features described in this abstract without departing from certain embodiments of the invention.

75 Claims, 11 Drawing Sheets

AUTOMATED DIGITAL VOICE RECORDER TO PERSONAL INFORMATION MANAGER SYNCHRONIZATION

TECHNICAL FIELD

This invention relates generally to the field of digital voice recording. Certain embodiments consistent with this invention relate to automated conversion and transfer of voice messages between digital voice recorders (DVRs) and integrated circuit (IC) recorders of audio signals, and personal information manager (PIM) software applications on a personal computer (PC).

BACKGROUND

In the last few decades electronic voice recorders have been used to capture thoughts and messages, summarize ideas, and document events across a variety of business and personal applications. Storage and playback of audio recordings has traditionally taken place on analog media or devices. More recently, the use of digital media and devices has become possible. In recent years the use of magneto-optical, solid state and Micro Drive digital storage technologies has triggered growth in use of digital audio self-recorded content. Accordingly, the number of Digital Voice Recorders (DVRs) has been growing in the last few years. DVRs have provided various benefits over analog voice recorders.

DVRs incorporate file-based content transfer capability. This capability has been performed, for example, by USB connectivity or by compatibility with a digital file removable storage media such as Memory Stick™ available also on the PC, along with many other transfer mechanisms known to those skilled in the art. In recent years, digital voice recording capabilities have been expanded from dedicated voice recorders to other consumer electronic categories. These categories have included digital music players with MP3 or ATRAC3 file playback capabilities, Cellular phones or Personal Digital Assistants (PDA) devices with built in or external microphone input, and digital imaging devices capable of image, text, or video as well as audio recording. All of these and other devices may be considered DVR devices for purpose of this document as long as they can be adapted to download audio files recorded on the device to a computer (PC), or upload content created on a PC to a DVR.

In recent years the PC has taken an important role as an entertainment device in a large number of households, as well as a business tool in the home and office. The PC has been used not only as a data depository and processing center for information such as documents, spreadsheets and audiovisual content, but also as a center for communications, scheduling and lifestyle management. Handling contact, calendar, and task information on the PC has often been done via software packages known as Personal Information Manager (PIM) applications. PIM software packages have assisted in facilitating email communications, time management, and responsibility tracking, to name a few. In many cases these PIM applications have also served as a vehicle of communication between a professional, such as a medical doctor, attorney, or a business manager, and their administrator. This communication vehicle has been provided via sharing access rights to schedule, tasks, and email between two computers located in the same office or two computing devices using a computer network such as a local area network or the Internet.

OVERVIEW OF CERTAIN EMBODIMENTS

The present invention relates generally to digital voice recording. Objects, advantages and features of certain embodiments of the invention will become apparent to those skilled in the art upon consideration of the following detailed description of the invention.

In one embodiment consistent with the present invention an apparatus for Automated Digital voice recorder to Personal information manager Synchronization (ADPS) has an interface that receives at least one voice file containing audio content and related information from a digital voice recorder (DVR) and a memory. A processor is programmed to carry out reading information in the voice file that associates audio content within the voice file with a personal information manager (PIM) application and processing the voice file by transferring the voice file to at least one PIM application.

In another embodiment consistent with the present invention an apparatus for Automated Digital voice recorder to Personal information manager Synchronization (ADPS) has an interface that enables file transfer to a Digital Voice Recorder (DVR). A processor is programmed that transfers at least one voice file containing audio content and related information from a Personal Information Manager (PIM) application across the interface to the DVR.

In another embodiment consistent with the present invention an apparatus for Automated Digital voice recorder to Personal information manager Synchronization (ADPS) message creation has a microphone and an analog to digital converter that converts analog microphone input signals to audio content in a digital format, a memory, and a user interface. A processor is programmed to receive an indication that an ADPS message is to be created, an ADPS type selection relating the ADPS message to be created to a type of Personal Information Manager (PIM) application, a start signal to begin recording audio content for the ADPS message to be created, and a stop signal to stop recording the audio content for the ADPS message to be created from the user interface. The processor then creates an ADPS message by organizing the ADPS type selection and the audio content into the ADPS message and storing the ADPS message in the memory.

The above overviews are intended to illustrate exemplary embodiments of the invention, which will be best understood in conjunction with the detailed description to follow, and are not intended to define or limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description, which describes certain exemplary embodiments of the invention, taken in conjunction with the accompanying drawings in which:

DETAILED DESCRIPTION

Figure 1:
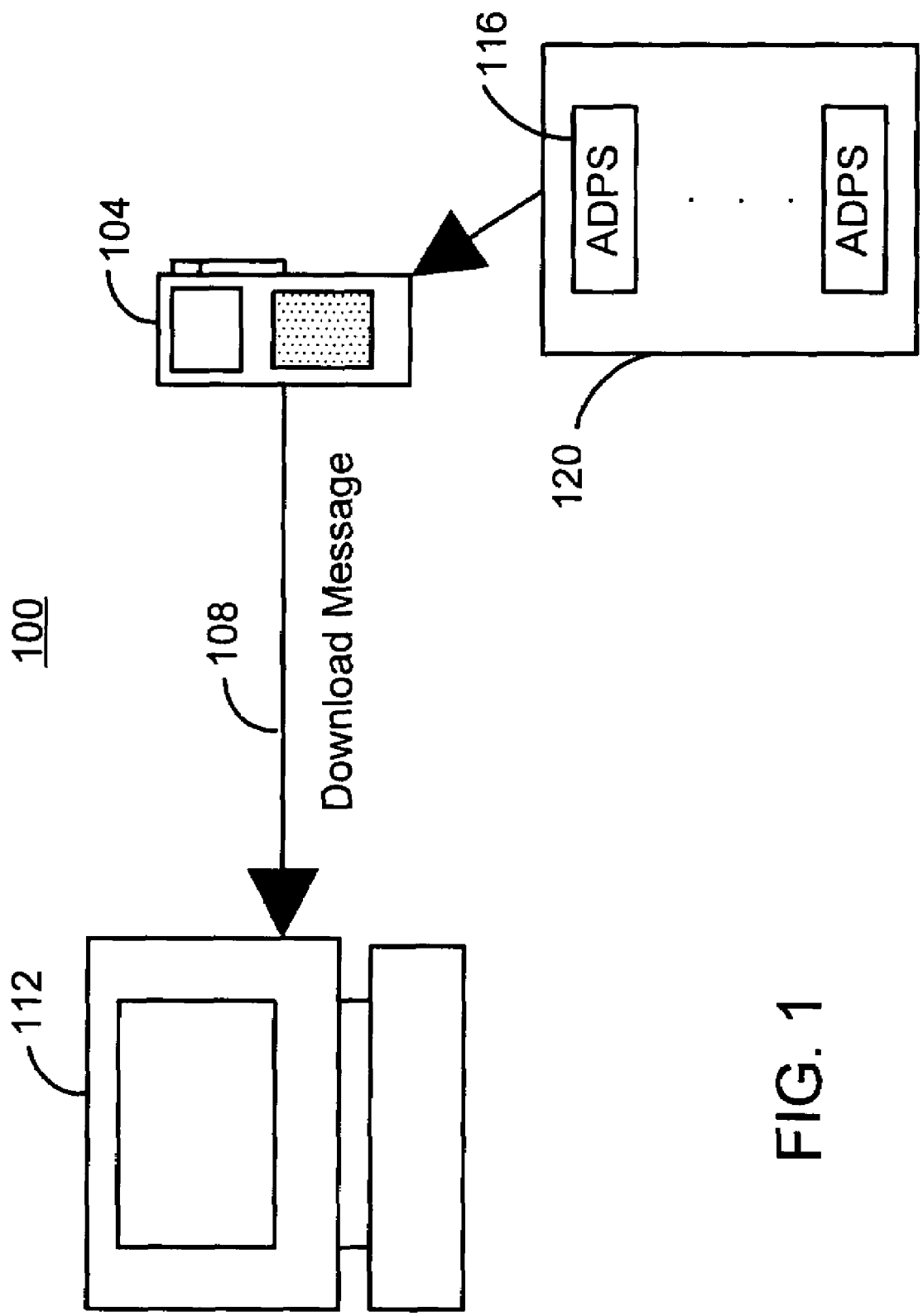
FIG. 1 is an Automatic DVR-to-PIM Download System (ADPS) consistent with certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar, or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/ dynamic load library and/or other sequence of instructions designed for execution on a computer system.

Audio information related to email communications, time management, scheduling, address management, or responsibility tracking can be captured on a DVR and transferred to a PC using the manual download capability provided by some DVRs. A DVR capable of downloading an audio file to the PC is often compatible with a software package that was designed specifically for it. In these cases, an audio file created on the DVR is transferred to this DVR Dedicated Software Application (DSA) on the PC via a manual file transfer over a USB interface, or other transfer mechanism known to those skilled in the art. Once the audio file is downloaded to the PC, the DSA may be used to manipulate the file (listening, managing, sharing, etc.).

Unfortunately, the existing DVR-to-PC synchronization experience is cumbersome, time consuming, and requires technical understanding of file management and software. The process involves manual user interaction with either the DSA or another application on the PC. These tasks may be a challenge depending on file naming convention, number of files already in the DSA, and simplicity of that application's user interface. Often this manual interaction involves listening to individual files and their content in order to remember what was recorded and for what purpose.

In many cases the user knows the intention in creating the audio message, or alternatively, the nature of the recording, before the recording takes place. However, without capturing their intention in recording that message at time of creation, they may be forced to reestablish their thoughts later on during file search on the PC. Further, a download of audio information recorded on a device directly to a PIM function, or conversely, an upload of information from a PIM function to a DVR, may be desired.

A mechanism, consistent with certain embodiments of the invention, to enable capture of the PIM destination (the target PIM application) for the recording, automatic download and processing of a message from the DVR directly to the appropriate PIM function, and automatic upload and processing of a message created in a PIM to a DVR is referred to in this document as the Automatic DVR-to-PIM Synchronization system (ADPS). An ADPS type message is a combination of an audio recording (or message content) and the information to allow processing of the message in the ADPS system. One exemplary ADPS enabled or activated device is a DVR that is capable of recording an ADPS type message and transferring it to a computer or other device, or a computer or other device that is capable of processing the ADPS message. This mechanism can generically be discussed as Automated Voice File Processing (AVFP).

As noted above, PIM applications include email, calendar and scheduling, task lists (To Do List), time management, address management, responsibility tracking, and many other applications designed to enhance a PC, or comparable product, user's productivity and simplify their activities.

Turning now to FIG. 1, one embodiment of an ADPS system 100 is shown. DVR 104 is connected through an appropriate mechanism, such as a USB connection 108 in this embodiment or by physical transfer of a removable media such as a memory stick, to a PC or comparable device 112, to enable download of an ADPS message 116 from an ADPS database 120 within DVR 104 to the PC 112. It should be noted, and should now be evident to those skilled in the art in view of this disclosure, that many other connection mechanisms (eg. Ethernet, infrared, wireless, serial, parallel, IEEE 1394, or any other suitable communication interface) can be used to connect the DVR 104 to the PC 112. Connection mechanisms, such as any standard or custom wireless protocol, or any other effective communication mechanism can be used for interconnection of DVR 104 to PC 112. When the DVR 104 is connected to PC 112, the ADPS message 116 is automatically downloaded to the appropriate target PIM application without a need to launch the DSA. In certain embodiments, there is no software launch required at all as will be discussed below.

Figure 2:
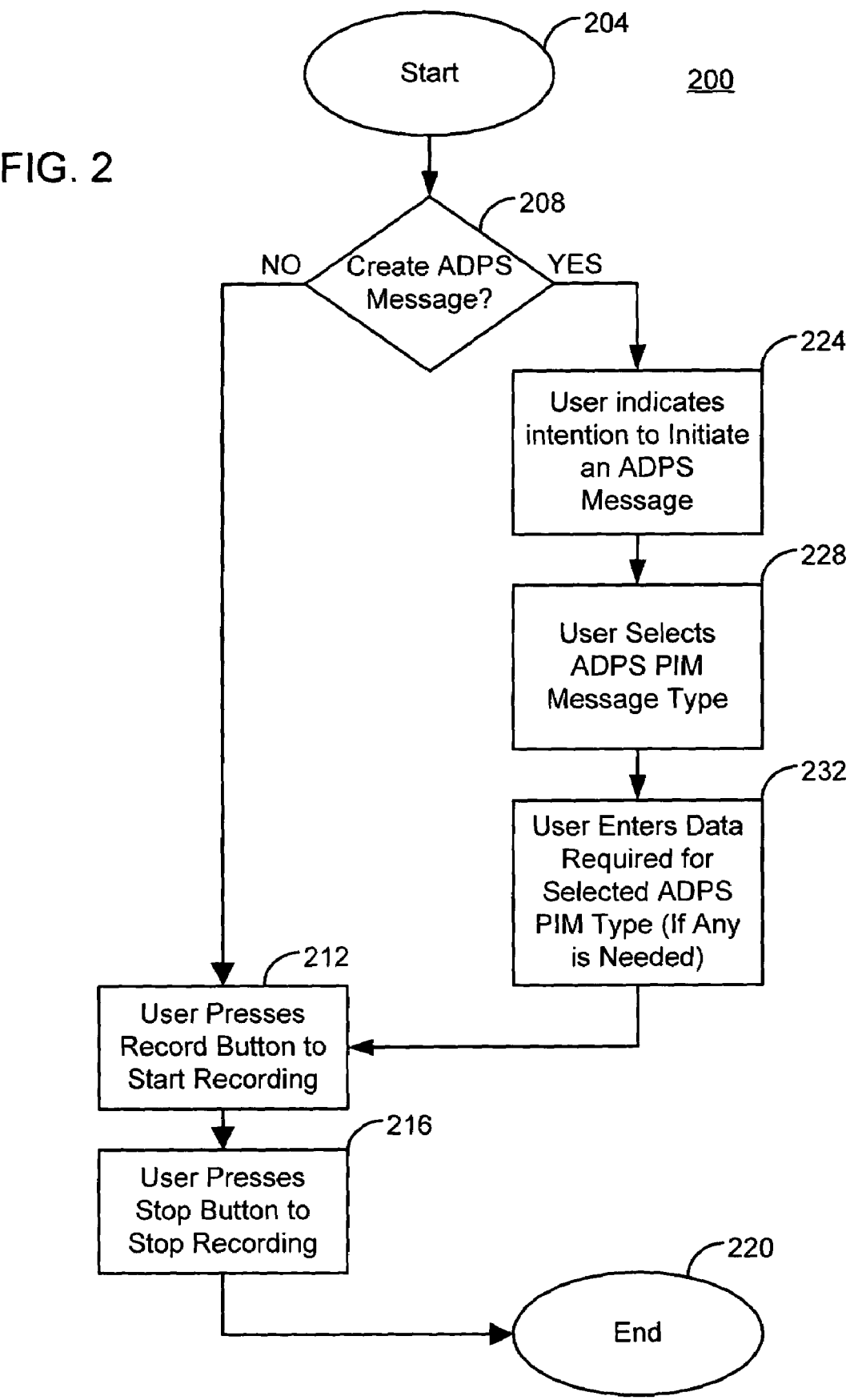
FIG. 2 is an ADPS message creation flow diagram consistent with certain embodiments of the present invention.

Turning now to FIG. 2, an exemplary user ADPS message creation flow diagram 200 is shown. This diagram starts at 204. At 208, the user determines whether to create an ADPS message 116 or a standard audio recording. If the user wants to create a standard audio recording, the user presses the record button at 212, and then at 216, the user presses the stop button to terminate the recording and the process ends at 220.

However, if the user wants to create an ADPS message 116 at 208, then at 224, the user uses a control mechanism on the DVR 104, such as pressing a MENU key, to initiate an ADPS message 116. At 228, the user uses a control mechanism, such as pressing a DOWN button, on the DVR 104 to select the ADPS message type (determines which PIM application is the target) to create from a list that is available on the DVR 104. At 232, the user uses a control mechanism on the DVR 104, such as manual entry of data in this embodiment, to provide any information related to the ADPS message 116 later on PC 112. Relevant information for the different ADPS messages defined in this embodiment will be discussed below. After the user has fully or adequately specified the information, if any, for the ADPS message 116, the user then presses the record button at 212 to record the voice information. At 216, the user presses the stop button to terminate the recording and the process ends at 220.

It should be noted that many other control mechanisms for identifying that the user wishes to create an ADPS message are possible. Voice queues and commands could be used through a voice recognition mechanism on the DVR 104 to initiate an ADPS message recording, to select the ADPS message type, and to enter any relevant information for the ADPS message, as well as for starting and stopping the recording process. Further, a touch screen and user interface, independent of or along with the vocal queues discussed above, is another possible solution. Those skilled in the art should now be able to recognize a variety of possibilities for ADPS message indication, ADPS type, and ADPS information entry and control of the apparatus in view of the present disclosure.

As well, with regard to information related to ADPS messages, the information can also be entered by recording an audio note. That audio note can be later transcribed on the PC 112 or can be transcribed on the DVR 104 itself if speech to text technology is incorporated into the DVR 104 firmware.

Figure 3:
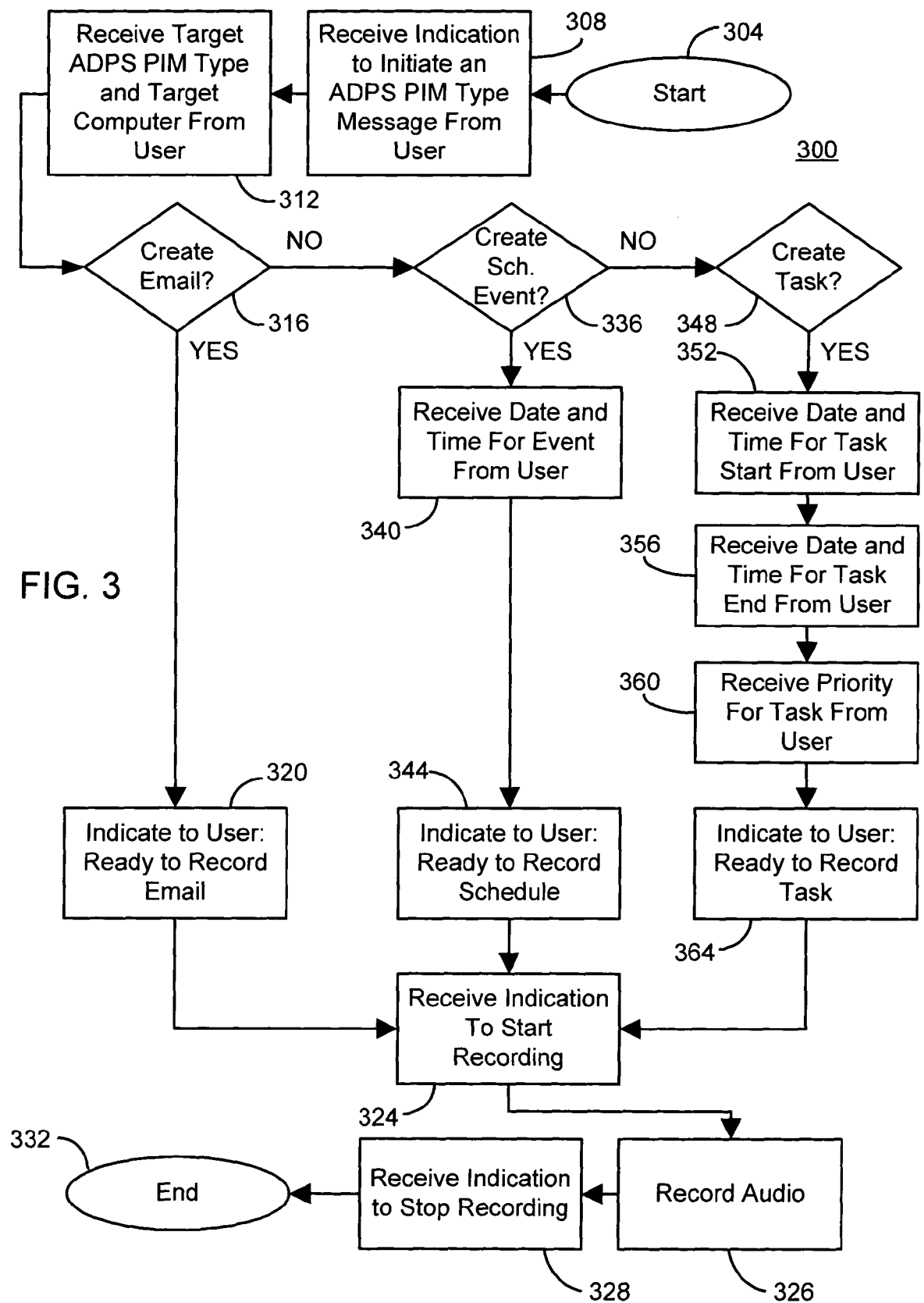
FIG. 3 is an internal DVR ADPS message creation flow diagram consistent with certain embodiments of the present invention.

Turning now to FIG. 3, an internal DVR ADPS message creation flow diagram 300 is shown. The flow starts at 304. At 308, an indication that an ADPS message is to be created is received from the user by any one of the previously mentioned or other possible control mechanisms. At 312, the ADPS message type selection and the computer target is received from the user. As mentioned above, in this embodiment the ADPS message type is selected from a list of possible ADPS message types that the user can choose from, and is also chosen by any one of the previously mentioned or other possible mechanisms. In the present embodiment, three different ADPS message types will be considered for simplicity, but these three ADPS message types should not be considered an exhaustive list of possible message types. The ADPS message types in this embodiment are an email message, a schedule event, and a task for a to-do list, but this should not be considered limiting. It should be noted that many other ADPS message types are possible and are considered consistent with this disclosure. The computer target selected at this stage could be an indication of "business" or "personal" in a simplified embodiment. The simplified selection of business or personal can, for example, allow a user to indicate to a secretary that the secretary should download all business related emails for processing while leaving the personal messages undisturbed on DVR 104. The computer target selection can, for example, also be a selection from a list of computers (eg. PCx, PCy, Laptop1, PC1, PC2) uploaded to DVR 104 with a process discussed below. This uploaded list option allows the user to select the specific computer that is a part of their network as the target computer. Other options for the computer target will be apparent to those skilled in the art based upon this disclosure.

At 316, the ADPS message type selection is evaluated to determine whether an email message type was chosen. If so, an indication is communicated to the user that the DVR 104 is ready to record an email message at 320. This indication can be communicated by use of visual display, such as a Liquid Crystal Display (LCD) message, an audible beep or other indication, a previously recorded or digitally created verbal indication, or any of a variety of other possible methods. At 324, an indication to start recording by any one of the possible methods discussed above is received and the recording process begins at 326. At 328, an indication to stop the recording by any one of the possible methods discussed above is received and the recording process stops. The internal DVR ADPS message creation flow 300 stops at 332.

If the ADPS message type selected by the user is not an email message at 316, the selection is evaluated at 336 to determine whether a schedule event was chosen. If so, other related information, for example, the date and time of the scheduled event is received at 340, by any one of the possible methods discussed above, and this information is stored along with the ADPS message type as will be discussed later.

At 344, an indication is communicated to the user that the DVR 104 is ready to record a schedule message. This communication to the user can be accomplished by any of the methods discussed above in relation to an email message recording or by any other appropriate method.

The internal DVR ADPS message creation flow 300 continues from 344 to 324 as discussed above for the email message recording where an indication to start recording by any one of the possible methods discussed above is received and the recording process begins. Subsequently, at 328 an indication to stop the recording by any one of the possible methods discussed above is received and the recording process stops. At 332, the internal DVR ADPS message creation flow 300 ends.

If the ADPS message type selected by the user is not a schedule message at 336, the selection is evaluated at 348 to determine whether a task message was chosen. If so, other related information, such as the date and time for the start of the task event is received at 352, by any one of the possible methods discussed above, and this information is stored along with the ADPS message type as will be discussed later. For task messages, an ending date and time may be desired. If so, the date and time for the end of the task event is received at 356, by any one of the possible methods discussed above, and this information is stored along with the ADPS message type and start date and time as will be discussed later. As well, a priority of the task may be specified. If so, the priority of the task is received at 360, by any one of the possible methods discussed above, and this information is stored along with the ADPS message type, the start date and time, and the end date and time as will be discussed later.

At 364, an indication is communicated to the user that the DVR 104 is ready to record a task message. This communication to the user can be accomplished by any of the methods discussed above in relation to email and schedule message recording or by any other appropriate method.

The internal DVR ADPS message creation flow 300 continues from 364 to 324 as discussed above for email and schedule message recording and subsequently to 328 and to 332 where the internal DVR ADPS message creation flow 300 ends.

Figure 4:
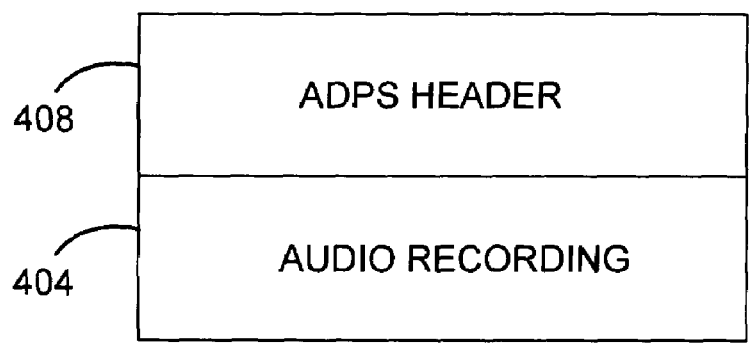
FIG. 4 is an ADPS message consistent with certain embodiments of the present invention.

Turning now to FIG. 4, one embodiment of an ADPS message 400 is shown. In this embodiment, the data associated with the audio recording 404 is digitally encoded as separate digital data that are concatenated to form the ADPS message header 408 that is itself concatenated with the audio recording 404.

Figure 5:
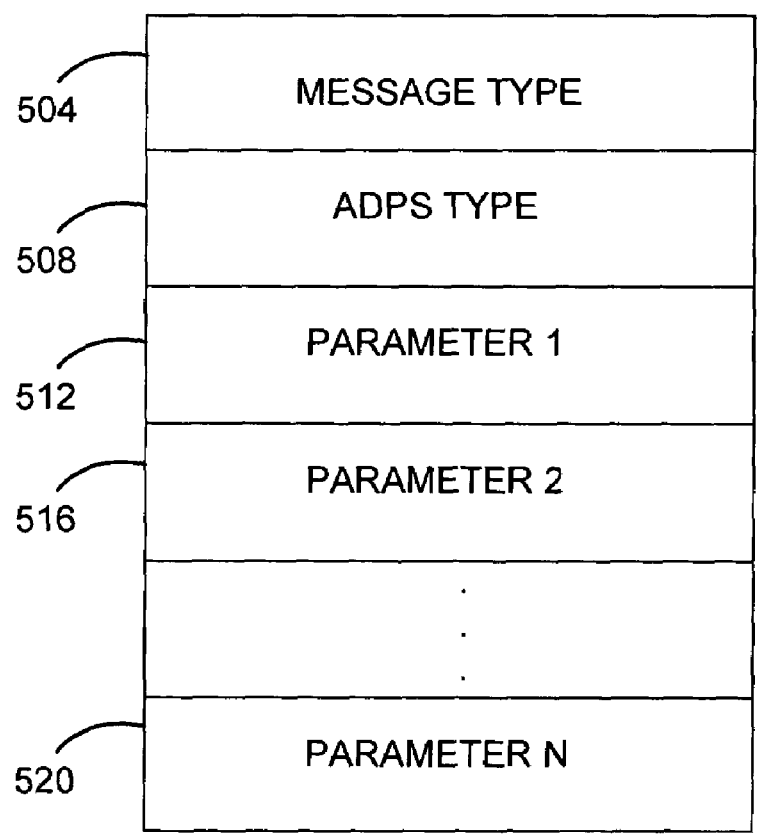
FIG. 5 is an ADPS message header consistent with certain embodiments of the present invention.

Turning now to FIG. 5, one possible embodiment of an ADPS message header 408 is shown. The message type is stored at 504. In this embodiment, the message type represents either a standard audio recording or an ADPS message 116. The message type 504 allows the PC 112 to properly process the audio portion of the message. If the audio message is a standard audio message (or any other non-ADPS message), then the PC application knows not to do any processing on the file during transfer from the DVR 104, but simply transfers the message to the appropriate destination as will be discussed below in the PC application section. However, if the message type 504 indicates that an ADPS message 116 was created, then the PC 112 can properly process the audio portion of the message as will also be discussed below in the PC application section.

As well, if an ADPS message 116 was created, then other fields of the ADPS message header 408 are populated with data. At a minimum, the ADPS type 508 is populated to indicate the destination PIM application for the ADPS message 116. This ADPS type 508 can be any of the ones discussed above in relation to FIG. 3, or other types related to other PIM applications in other embodiments.

As discussed above, if the ADPS message 116 is of an email type message, then no other parameters may be relevant or helpful for the PC 112 to properly process the ADPS message 116. In this case, parameter fields 512 through 520 may not be used. These fields can then either be excluded from the header, thereby making the ADPS message header 408 dynamic in length, or can be blank data fields or can be populated with other relevant parameters. However, these fields can remain without inhibiting the processing of the ADPS message at PC 112.

It should be noted that a dynamic or variable length for the ADPS message header 408 may be used as long as the PC 112 and DVR 104 have a common understanding of what parameters exist, and their placement within ADPS message header 408, for each type of ADPS message 116. With this in mind, it should now be apparent to those skilled in the art, upon consideration of this teaching, that a header length parameter is not necessarily relevant information, but this parameter may also be included in the ADPS message header 408 without inhibiting the processing of the ADPS message 116 on PC 112. The method by which new ADPS message types are created and loaded into the DVR 104 will be discussed below.

When the ADPS message 116 is either a schedule, task, or other message type as may exist in other embodiments, then the parameter fields 512 through 520 are populated as appropriate for the specific ADPS type 508 with the appropriate data retrieved from the user as discussed above in relation to FIG. 3.

Other options and possibilities exist for fields in the ADPS message header 408. For example and without limitation, log information related to the discussion below can be a part of the ADPS message header 408. Flagging log information within ADPS message header 408 can be done in place of or in conjunction with separate log creation on either the PC 1 112 or DVR 104.

It should also be noted, as discussed above in relation to FIG. 2, that the voice queues, commands, or audio notes, along with many other possible mechanisms, could be used on the DVR 104 to initiate an ADPS message recording, to select the ADPS message type, and to enter any information for the ADPS message. In the case of captured voice commands or audio notes and information, this information can be stored as part of the audio recording itself thereby allowing the ADPS message header 408 to contain only the message type 504.

Accordingly, an audio recording may be time stamped if the DVR incorporates an internal clock. In this case, this time-stamp parameter may be included in the ADPS message header 408 by many of the previously discussed or possible alternate methods as should now be apparent to those skilled in the art.

Figure 6:
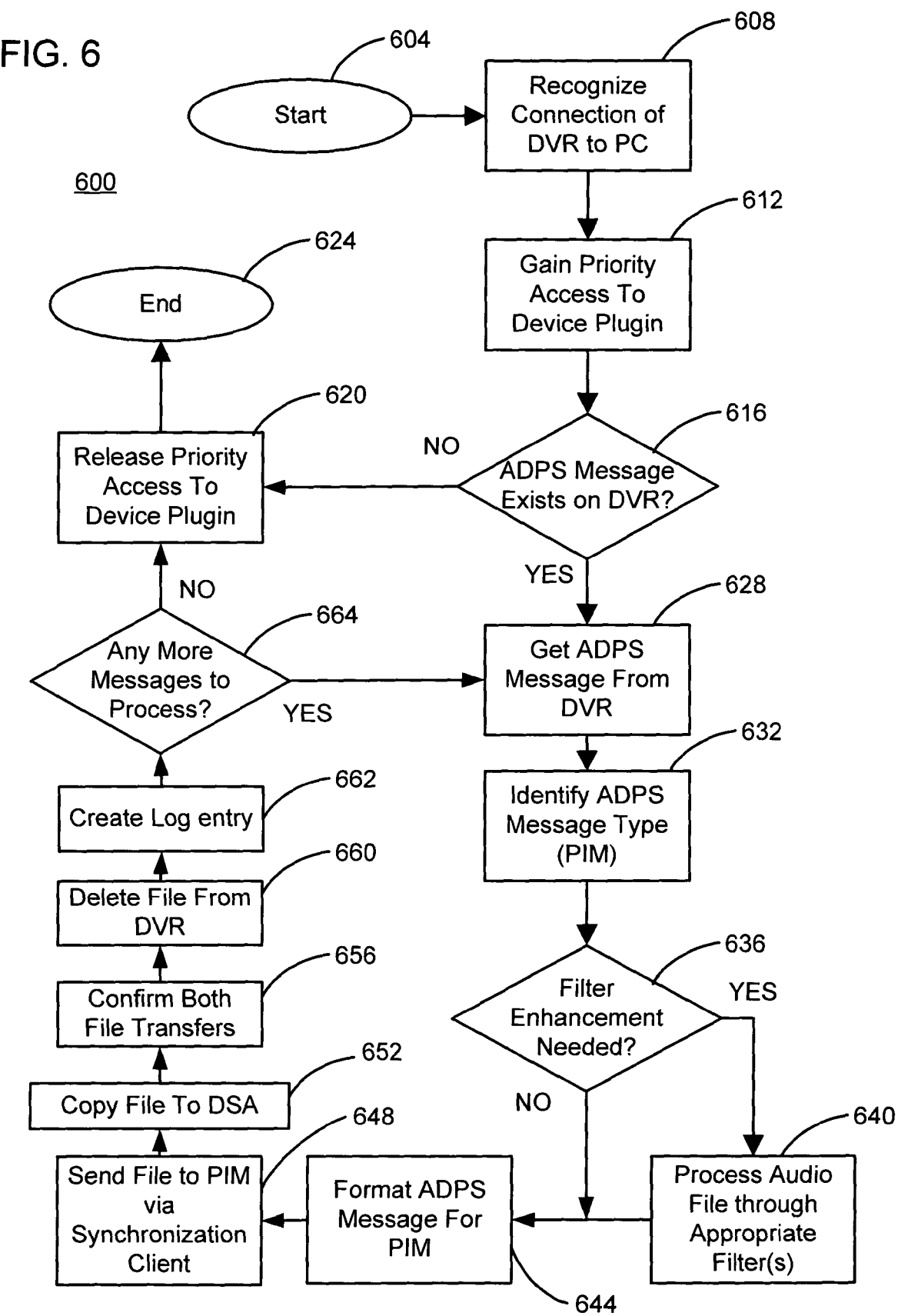
FIG. 6 is an ADPS download process consistent with certain embodiments of the present invention.

Turning now to FIG. 6, an exemplary ADPS download process 600 is shown. The process starts at 604. At 608, the ADPS download process 600 recognizes that a DVR 104 has been connected to PC 112. A Device Plugin that is resident on PC 112 (as discussed below) controls access to DVR 104. It should be noted that the term "Device Plugin" is used herein generically. Any other interface that is capable of interfacing between the process and the physical communication layer or communication protocol interface that is used to interconnect the PC 112 and the DVR 104, as discussed above, can be considered consistent with this disclosure and the use of the term Device Plugin. At 612, priority access to the Device Plugin is gained through a request/grant process. The priority access scheme is used to determine which of the possible applications, such as the DSA, will connect to the DVR 104. When priority access to the Device Plugin is granted, ADPS download process 600 determines whether there are any ADPS messages 116 on DVR 104 that can be processed at 616. If no messages on DVR 104 can be processed at 616, ADPS download process 600 releases priority access to the Device Plugin at 620, and the process ends at 624.

On the other hand, if there is at least one ADPS message 116 on DVR 104 that can be processed at 616, the process gets (receives) an ADPS message 116 at 628. At 632, the ADPS type 508 is determined by reading information that associates the voice content with a PIM application from the ADPS message header 408. As discussed, the ADPS type 508 determines the destination PIM application for the ADPS message 116. Additional parameter fields 512 through 520, when appropriate for that message type, are included in the ADPS message header 408.

Depending upon the PIM application, certain enhancements to the recorded audio message can be done by use of enhancement filtering (e.g., transcription, enhanced audio, transcoding, or many other options as described in more detail below). Based upon setup parameters in relation to the destination PIM application, ADPS download process 600 can determine whether filter enhancements are appropriate. If a determination that these filter enhancements are appropriate is made at 636, the process transitions to 640 to process the audio portion (voice/audio content) of ADPS message 116 through the relevant enhancement filter(s) to create a post-enhancement audio portion, text portion, or both. If no enhancement processing is appropriate at 636, or after enhancement processing at 640, the process transitions to 644.

Depending upon the destination PIM application, the ADPS message 116 may be reformatted (or converted) to properly interface it with the destination PIM application. If this reformatting is to be done, the ADPS message 116, with post-enhancement audio portion (this could be a transcription, enhanced audio, transcoding, or many other options as described in more detail below), may be reformatted for the destination PIM, at 644. This reformatting can be a conversion between a compressed and non-compressed formats, reorganization of the message fields, or any other type of conversion that may be possible. For example, and not by way of any limitation, a user may choose to store their email in a space-economical format (e.g., MP3, LPAC, or other codec) for distribution on the Internet, and may choose to store reminders in a non-space-economical format (e.g., .wav format).

At 648, the reformatted and possibly enhanced ADPS message is then sent (transferred) to a PIM through a PIM synchronization client. At 652, the reformatted and possibly enhanced ADPS message is also copied to the DSA for archival.

At 656, both transfers (to the PIM and DSA) are confirmed and if confirmation is acknowledged, the ADPS message file 116 is deleted from the DVR 104 at 660. A log entry is created at 662 to record the processing. As discussed above, the log entry can be flagged in the ADPS message header 408 alone, or the log entry can be created on either PC 112 or DVR 104. At 664, the process determines whether there are any more ADPS messages 116 on DVR 104 that can be processed. If there are more ADPS messages 116 on DVR 104 that can be processed, then a transition is made to 628 to process the next message. If there are no more messages to process at 664, the process transitions to 620 to releases priority access to the Device Plugin and then ends at 624.

Figure 7:
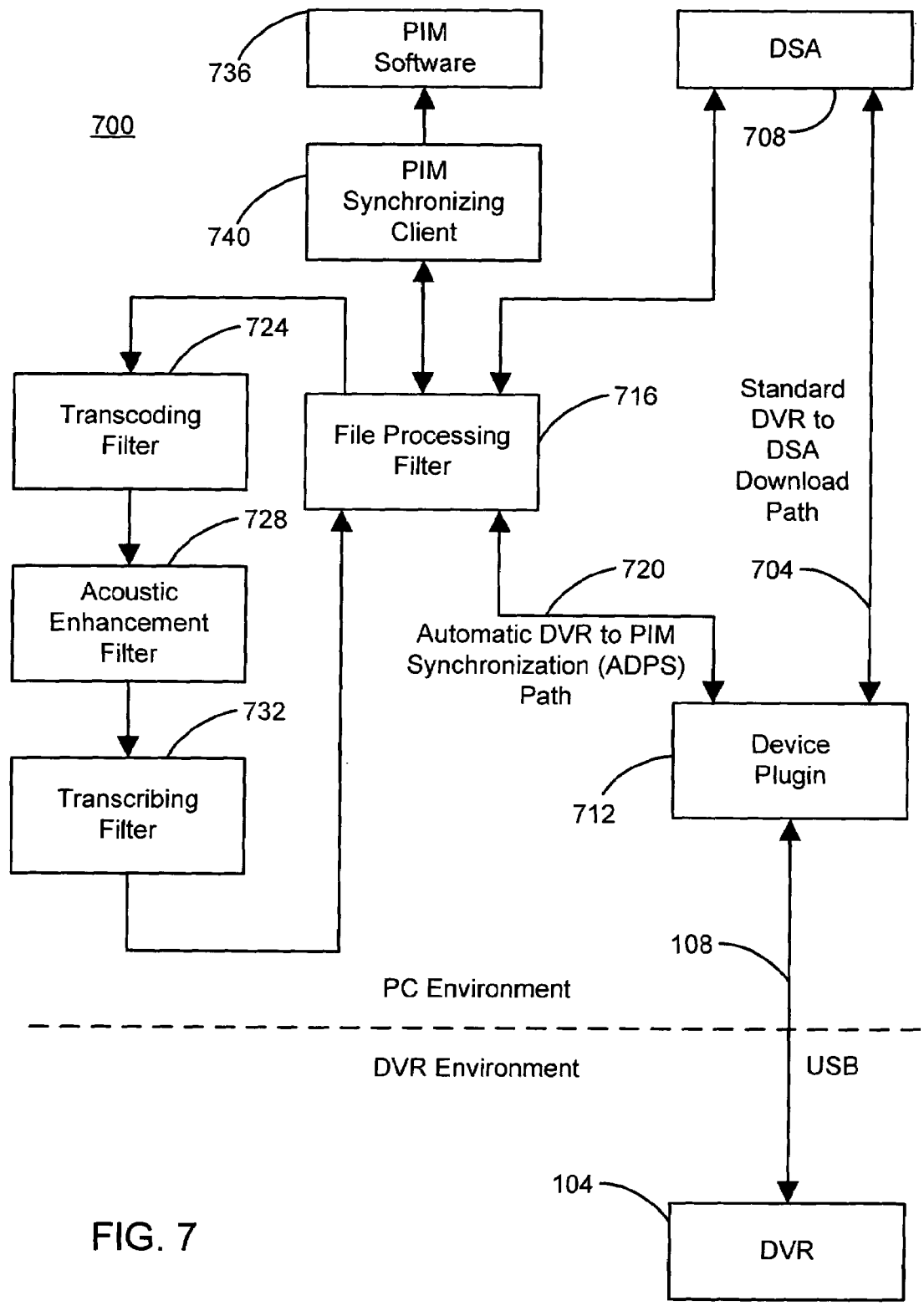
FIG. 7 is an ADPS download system block diagram consistent with certain embodiments of the present invention.

Turning now to FIG. 7, ADPS download system block diagram 700 is shown. ADPS download process 600 can be implemented within ADPS download system 700. ADPS system 700 augments the standard DVR-to-DSA download path 704 without destroying it. Using the standard DVR-to-DSA download path 704, the message recorded on the DVR 104 can be downloaded as a file via a DVR-to-PC connection, such as USB connection 108 in this embodiment. The file can be transferred to the DSA 708 through a Device Plugin 712 (briefly discussed above). The Device Plugin 712 manages access of software applications to the DVR 104 in order to transfer message data via the physical communications layer (USB protocol in the present exemplary embodiment). In order to handle recorded files, the user launches the DSA 708 and manages files as discussed above.

The File Processing Filter (FPF) module 716 uses ADPS path 720 to communicate with DVR 104 and has priority over the DVR-to-DSA download path 704 in accessing the Device Plugin 712. This allows the automated process to work in an uninterrupted fashion relative to DSA 708.

The FPF 716 has several responsibilities. Some of them for this embodiment may include without limitation: to activate/deactivate the ADPS feature on DVR 104, to manage file transfer from DVR 104 through Device Plugin 712, to process the file through the various file enhancement filters (to be discussed below), to transfer the result of the file enhancement activity to the PIM Synchronization Client (to be discussed below), to transfer the file to the DSA 708, to delete the file from DVR 104 after download and processing is complete, to keep a log of processed files, and to grant Device Plugin 712 access to DSA 708 after the automated download is complete.

Activation and deactivation of the ADPS feature on DVR 104 is accomplished by user interaction with FPF 716. The ADPS function may be activated on DVR 104 by a software command from PC 112. Once DVR 104 is connected to the PC 112, the FPF 716 will first verify that the DVR is ADPS activated. If it is not ADPS activated, an automatic activation may take place. Activation will enable the enhancements discussed above in DVR 104 functionality. These enhancements can enable entry of message content as well as additional information that describes the message, as discussed above for actions related to creating an ADPS message on the DVR. In some cases, the DVR 104 ADPS functionality can also be deactivated. The user may specify a request to activate or deactivate the DVR 104 ADPS functionality by interfacing with the FPF 716 through a setup screen on PC 112 or DVR 104.

Management of the file transfer from DVR 104 through Device Plugin 712 can be automated in accordance with certain embodiments. The FPF 716 identifies if there are files to process upon DVR 104 to PC 112 connection. The FPF 716 selects those files to be processed. These files can be transferred to PC 112 via Device Plugin 712.

Configuration of ADPS download system 700 to process the file through the various file enhancement filters can be accomplished through FPF 716 settings. The selected enhancements to the file may be of one, several, or none of the processes available on PC 112. The selection may depend on the nature of the recording allowing, for example, email type messages to be transcribed and schedule event type messages to be acoustically enhanced and then transcoded. The enhancing filters may be independent software modules created by a separate manufacturer. These filters may be installed, launched, and managed independently of the ADPS system 700 or the FPF 716 functionality. The recorded file is fed into these enhancing filters as an input, either sequentially or in parallel, depending upon the configuration selected for FPF 716. The order of processing can vary from that discussed below and such a variation is considered consistent with the processing described.

Many possibilities exist for the file enhancement filters. For example, the file enhancement filters could be a transcoder, an acoustic enhancer, a transcriber, or any other file enhancement filter that becomes apparent to those skilled in the art in view of this disclosure. The file enhancement filters can be implemented using hardware or software operating on a general purpose processor. The following order of processing can be configured during setup.

With transcoding filter 724, the file may be transcoded. Through the transcoding filter 724, the file is transcoded to a specified codec and the resulting file is then output from transcoding filter 724. The file could be transcoded to a different bit rate, changed to Variable Bit Rate (VBR), changed to Fixed Bit Rate (FBR), etc.

With acoustic enhancement filter 728, an acoustically enhanced file is the output. This acoustic enhancement can include any of a variety of acoustic enhancement measures, including but not limited to those commonly known to those skilled in the art. For example, limiting, clipping, compressing, expanding, notch filtering, band-pass filtering, low-pass filtering, high-pass filtering, noise reduction, equalization, noise gating, and many other audio acoustic enhancements can be performed.

With transcribing filter 732, the output may contain the audio file as well as a text file representing the transcribed audio content, are the outputs. The audio file may be discarded or redirected as discussed below. Transcribing can be carried out using custom software, or commercially available products such as "Dragon Naturally Speaking" available from ScanSoft, Inc.

A recorded message that was transferred is considered information. This information is ultimately intended for a destination PIM application 736. This routing is done in conjunction between FPF 716 and a PIM Synchronization Client 740. Regarding the transfer of the result(s) of the file enhancement activity to the PIM Synchronization Client 740, the FPF 716 communicates with the PIM Synchronizing Client 740. The PIM Synchronizing client 740 is placing the audio/text body of the message in the appropriate area of the PIM application 736. The PIM Synchronizing Client 740 may take the form of a separate software component from the FPF 716 (but need not be a separate software component) and may also be created by a different software manufacturer. The PIM Synchronization Client 740 may be installed and setup independently of the ADPS system 700 or the FPF 716 functionality. However, since there are PIM Synchronization Client 740 and the FPF 716 functionality dependencies, there may be advantages to using one setup procedure for both modules.

It should be noted that PIM application 736 is represented as one component. This is for ease of presentation only. There may typically be many PIM applications on a given PC 112. PIM functions can also be incorporated into a plurality of user interfaces. Therefore, in any discussion about PIM application 736, the reader should keep the possible inherent plurality of PIM applications in mind.

The user may decide to automatically download a file to the DSA 708 whenever an ADPS process 600 executes on ADPS system 700. The FPF 716 may download all files on DVR 104 to DSA 708. FPF 716 may also download only those files that are processed for purpose of PIM management. In the last case, the user may want to keep a backup of the file in DSA 708. As part of the FPF 716 setup process, the user may specify automatic file to DSA 708 download.

After downloading, processing and directing a file to the appropriate PIM application 736, the user may not desire to keep the recorded message on DVR 104. In that case, an automatic 'delete file on DVR' action takes place. Note that the delete function is preceded by an acknowledgment that the message file has been stored on the PC 112 hard drive. Only when the FPF 716 receives the acknowledgment can the file be deleted from DVR 104.

The FPF 716 can keep a log of all files processed. When a message is processed, it is flagged by the FPF 716. Thereby, the next time that DVR 104 is connected to PC 112, the same file can be prevented from being processed again. Therefore, a message recorded for purpose of an email message will only appear in one email message in the email PIM application. Whenever, DVR 104 is connected to PC 112, FPF 716 can compare records of files on DVR 104 to the log that has been previously created. If the file has no log record on that computer, it can be downloaded and processed as a new file. FPF 716 can also be able to identify files modified on DVR 104, even if these files were downloaded before the modification. In that case, FPF 716 can either download or not download the file depending on preference settings specified during the setup procedure for FPF 716. Further, as a configuration option for FPF 716, the files on DVR 104 can default to either allow them to be synchronized to multiple computers or a single computer.

One exemplary way to manage the log is by storing the log file on PC 112. Another is to store the log file on DVR 104. If stored on DVR 104, the log file can record transactions to multiple computers (Personal, Business, PCx, PCy). An alternative way to track a processed file is to add a 'downloaded' flag corresponding to processed files on DVR 104. Files that were downloaded using FPF 716 can be flagged as 'downloaded,' whereas files that were not downloaded can have their 'downloaded' flag unaltered. When the 'downloaded' flag is set, there is no downloading of the file the next time that DVR 104 is connected to a specified PC such as PC 112. The 'downloaded' flag may be one of the file's attributes and can be changed on DVR 104 by an action taken on PC 112. FPF 716 can then identify which files are to be processed and which ones are not based on that flag information. When a file that was newly created on DVR 104 is automatically downloaded to PC 112, FPF 716 changes the flag information of that file to 'downloaded'. When the user selects an option not to delete a file on DVR 104 after processing and thereby allow later file modification or copying to another PC, another option that can be set by the user is for the 'downloaded' flag to be cleared when an existing file is later modified on DVR 104, or for the 'downloaded' flag not to be set when copied which allows copying to another PC. This will allow the user to determine whether to reprocess a file if it is modified on DVR 104 or to process the file if it is to be downloaded to another PC.

The ADPS process 600 executing on ADPS System 700 only takes place once the DVR is connected to PC 112 via USB 108, or when removable media such as a memory stick that contains ADPS files is inserted into PC 112. Once FPF 716 is done with all its activities, the automated process is over. At that point, the user may launch and use DSA 708 software to manage recorded files on PC 112 or on DVR 104. In order to enable DSA 708 to access DVR 104 through Device Plugin 712, FPF 716 gives up its priority for access to Device Plugin 712. FPF 716 gives up the device access until the next time that USB 108 recognizes a DVR getting connected to PC 112.

In order to enable the FPF 716 priority access to Device Plugin 712, Device Plugin 712 can be designed to allow device access by multiple modules. Device Plugin 712 can then prioritize FPF 716 access when first detecting a connected DVR 104. Once FPF 716 relinquishes access to Device Plugin 712, DSA 708 can have access to DVR 104 until the next time that a new DVR connection is detected. The new device connection and detection process takes place in cases such as when a USB cable is connected to PC 112 or when a PC 112 is starting up when a USB cable is already connected.

Setup procedures for the above-mentioned ADPS process 600 and ADPS system 700 can now be discussed. Additional possibilities exist for FPF 716 to activate DVR 104 and automate the ADPS process 600. A setup procedure can be run on PC 112 that sets up the interface preferences for ADPS process 600 and ADPS system 700. A DVR 104 capable of downloading audio files to a PC 112 interacts with a DSA that allows management of these files. This functionality can be done after the installation and activation of the DSA 708. However, no special activation is required on the DVR side when the download functionality is built into the DVR 104 firmware, though an activation mechanism may be used to allow for the ADPS feature set to be enabled upon purchase of the feature set. DVR 104 may have two different patterns of behavior: Regular Behavior is capable of use for downloading an audio file from the DVR 104 to the DSA 708, and PIM-related Behavior is available when an indication of an ADPS type message is made. In the PIM-related Behavior mode, the downloaded file is being processed and directed to the appropriate PIM function. The PIM-related behavior capability may be activated through an ADPS activation in order to enable a change of DVR 104 behavior. In that case DVR 104 can be connected to the PC 112 and software running on the PC 112 will activate this special function on DVR 104. This software activation of a device behavior is similar to closing a power switch on an electric system. When the switch is turned off PIM-related functionality is not available. When the switch is turned on, the system is capable of operating in Regular as well as PIM-related Behavior mode.

In addition to activating ADPS device functionality, the setup of functions on PC 112 to enable automatic processing of the audio content once it is downloaded to the PC 112 can also be done.

In order to enable automatic processing of the audio content once it is downloaded to PC 112, several settings are possible for the setup of the FPF 716. Some of them are automatic transcription, automatic transcoding, removing or retaining the file on DVR 104 after processing, and downloading of the file to the DSA for archival.

Automatic Transcription allows an automatic transcription process such as running a speech to text application. The user may want to use the transcription function in conjunction with the file download (e.g., Transcribe a file and also filter the file). The function may be associated with all PIM functions or with a specific PIM function. So, for example, a message recorded to be an email communication may be transcribed into the email message in the PIM whereas a schedule event may be transferred to the PIM without automatic transcription. In addition, after the file is transcribed, the user may not wish to send the audio file itself. In that case, the user may want to edit a text message without dealing with the audio file embedded in that PIM's function. After the editing is done, the user can send text only email communication based on the transcribed audio file. The setup process enables the user to choose their preferred handling of the audio and the transcribed files.

Automatic transcoding allows transforming a file recorded in one codec scheme to another as discussed above. Transcoding may be desired for many purposes such as further compression or use with more ubiquitous formats such as .wav or .mp3. Since native playback and recording of audio content may vary from one DVR model to another, transcoding may provide consistency with other audio content synchronized from a DVR or recorded on the PC 112 as well as for content that may need to be uploaded from the PC to another DVR. Native transcoding may be selected for some PIM message types but not others in certain embodiments.

Removing or retaining a file on the DVR after download is another possible option. A user may want to retain a copy of the file on the DVR even after download. In those cases, they may not want to remove the message from the DVR after download. Removing the message after download creates space on the DVR for additional audio recordings. During the setup process the user may select their preferences for automatic or manual removal of files from DVR 104.

Download the file to the DSA is another possible setup option. Users may want to download a copy of a file from the DVR to the DSA. The DSA could be used as a backup for files that are removed from the DVR and placed in the PIM. The advantage of downloading to the DSA in addition to PIM download may be having a backup of audio files in the one application that handles all recorded files (the DSA). In addition, the automatic download of all files to the DSA, may remove the action of separately specifying the download within the DSA interface. The user may be given an option to select their preferences for DSA file download.

A folder structure may assist in backup and management of files in the DSA. For example and not by way of limitation, all email ADPS messages can be stored in a dedicated folder, while schedule ADPS messages and regular recordings can be stored in different folders.

When enabling functionality on DVR 104 and setting up the download system on the PC are completed the system is ready for recording and automatically downloading ADPS type messages. The recorded file may automatically be downloaded and managed. An indication, such as an icon on the PC 112 Desktop Task Manager, may be an acknowledgment that the FPF 716 is active. In this way, a user that does not want the FPF 716 to be resident could close the FPF 716 anytime they wish. Disabling the FPF 716 immediately makes the Device Plugin 712 accessible by the DSA 708. Settings can be changed at any time by recalling the FPF 716 setup prompts on PC 112.

In view of the present teaching, one skilled in the art should now be able to recognize that many other possibilities exist for setup and configuration of the DVR and PC environments, and all are considered within the scope of the disclosure.

Figure 8:
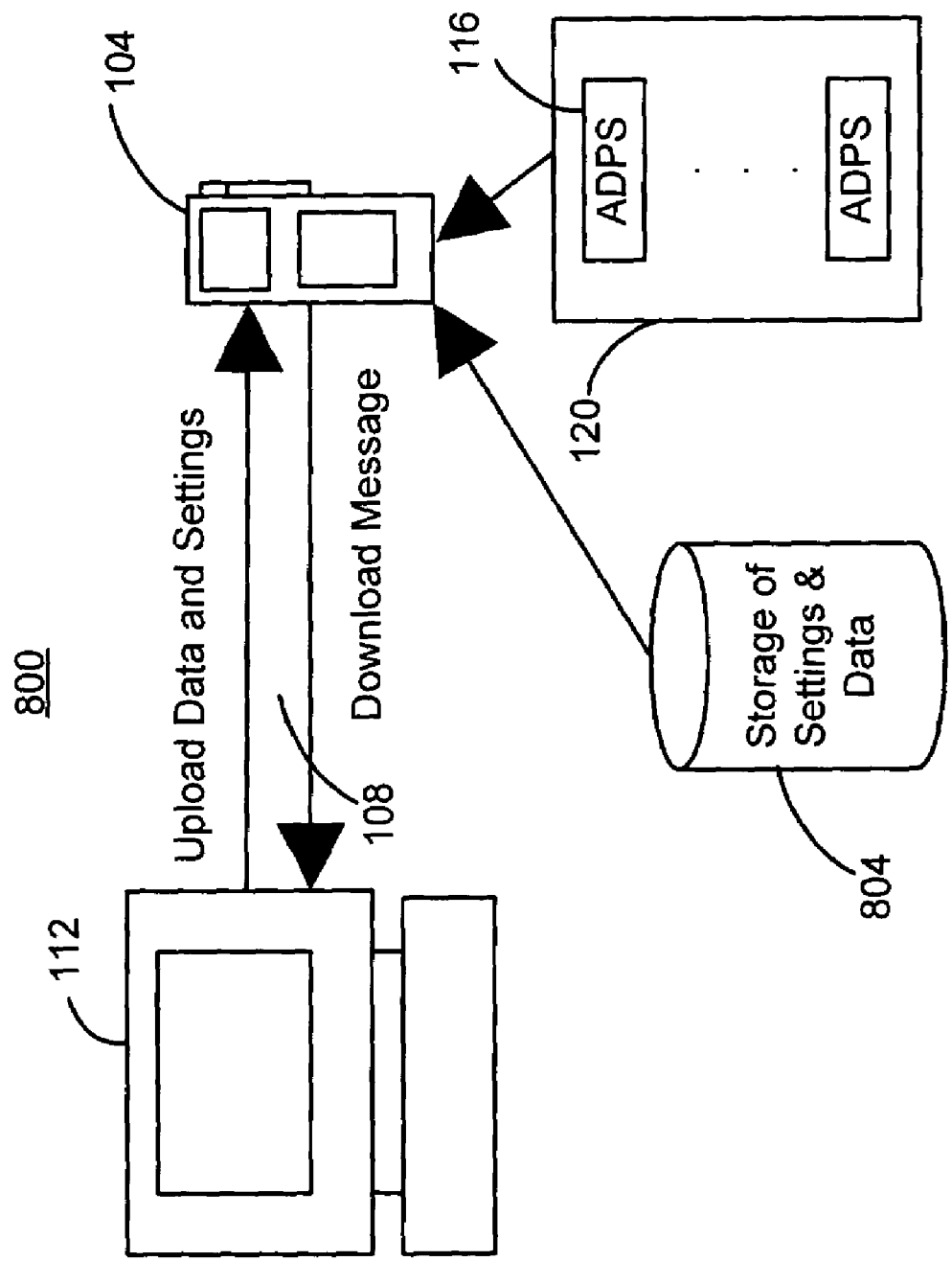
FIG. 8 is another ADPS system consistent with certain embodiments of the present invention.

Turning now to FIG. 8, a second embodiment of an ADPS system 800 is shown. DVR 104 is connected through an appropriate mechanism, such as a USB connection 108 in this embodiment, to a PC or comparable device 112, to enable download of an ADPS message 116 from ADPS database 120, to the PC 112. As previously noted, other connection mechanisms can be used to connect the DVR 104 to the PC 112. Connection mechanisms, such as any standard or custom wireless protocol, removable media (e.g., FLASH, CD-R, SMARTMEDIA™ CD-RW, HDD, magnetic discs, or MiniDisc), or any other effective communication mechanism can be used for interconnection of DVR 104 to PC 112. When the DVR 104 is connected to PC 112, the ADPS message 116 may be automatically downloaded to the appropriate target PIM application without launching the DSA. USB connection 108, or any other effective connection, can also be used to upload settings and data 804 from PC 112 to DVR 104. This upload capability allows a user to create new and custom ADPS message formats. These new and custom message formats may include the new ADPS type and parameter sets. This feature allows the adaptation of the ADPS system 800 to other PIM applications as they become available, as well as reconfiguration and augmentation of the existing user interface on DVR 104.

Figure 9:
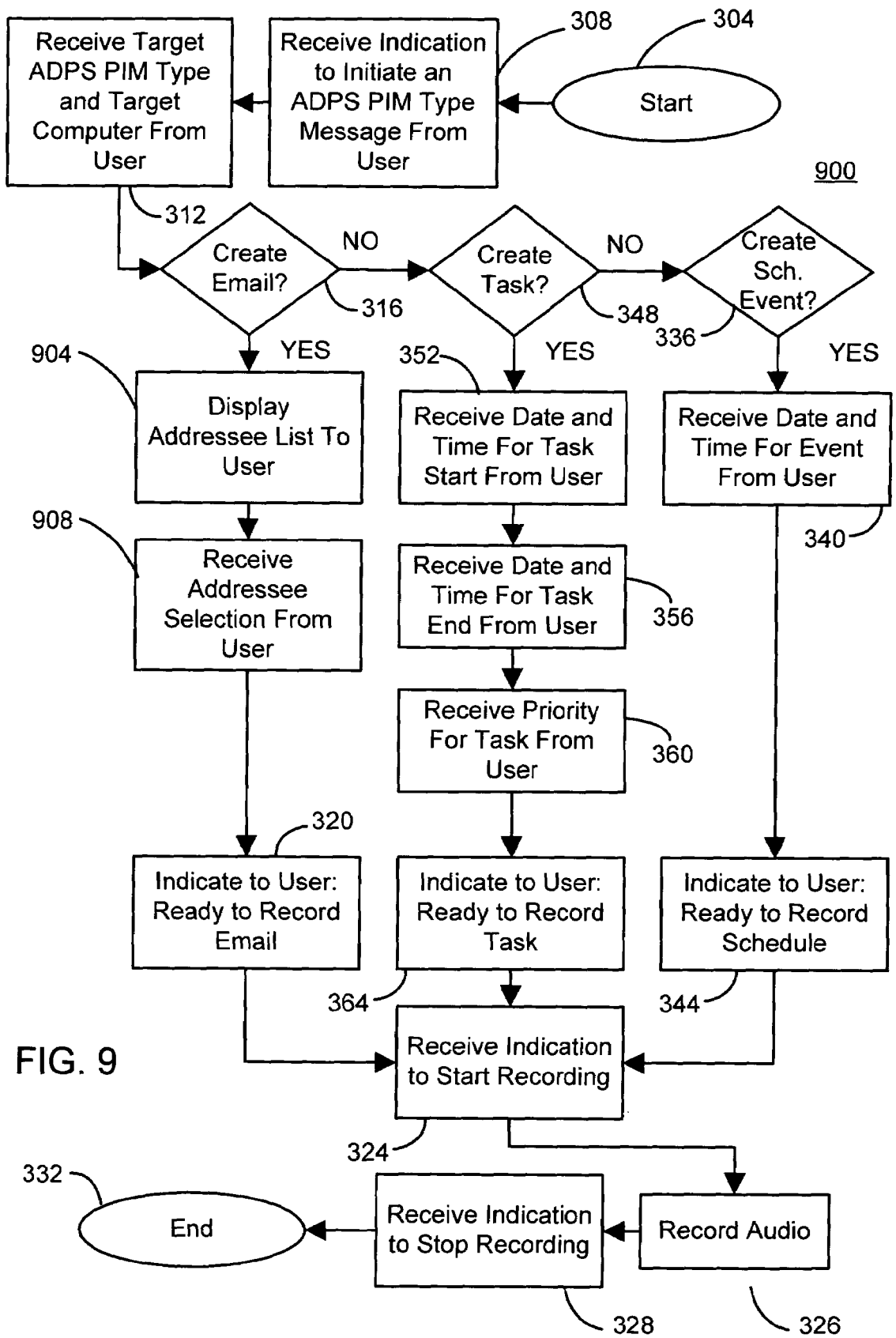
FIG. 9 is another internal DVR ADPS message creation flow diagram consistent with certain embodiments of the present invention.

Turning now to FIG. 9, a modified internal DVR ADPS message creation flow diagram 300 is shown as internal DVR ADPS message creation flow diagram 900. This modified version of DVR ADPS message creation flow diagram 300 shows two of the many possible modifications a user can achieve with the user of the upload capability of ADPS system 800.

First, one can notice by inspection of the two figures that the order of the list of ADPS message types presented to the user can be altered. In FIG. 9, the columns of activity related to the ADPS message type selected by the user are swapped in the list. Therefore, the schedule ADPS message evaluation 336 and the presentation of that message creation option to the user are before the task ADPS message evaluation 348 and presentation of that message creation option to the user. This list ordering can represent the order of items in the ADPS message type list as modified by the user and can alter both the internal processing of a message selection and the order of operations that are available for the user.

The second modification in this embodiment is that a list of addressees for email messages has been uploaded to DVR 104 and presented to the user at 904. At 908, the user's selection for the addressee of the email ADPS message is received and the processing continues with the addressee information becoming a new parameter in the ADPS header. As such, the user can modify the ADPS message header and message format, the information available to the user during an ADPS message interaction session, and the behavior of the DVR 104 during an ADPS message interaction session.

Thus, a computer data signal embodied in a bit stream can be communicated between a Digital Voice Recorder (DVR) and a host computer with a segment of data representing a digital voice message and a header containing information that defines an association between the digital voice message and a personal information manager (PIM).

It should now be apparent upon consideration of this teaching to those skilled in the art that many other modifications to the DVR 104 environment are possible with the upload capability of ADPS system 800, such as adding a new message type, audio contact information, complex records, and other custom records.

Figure 10:
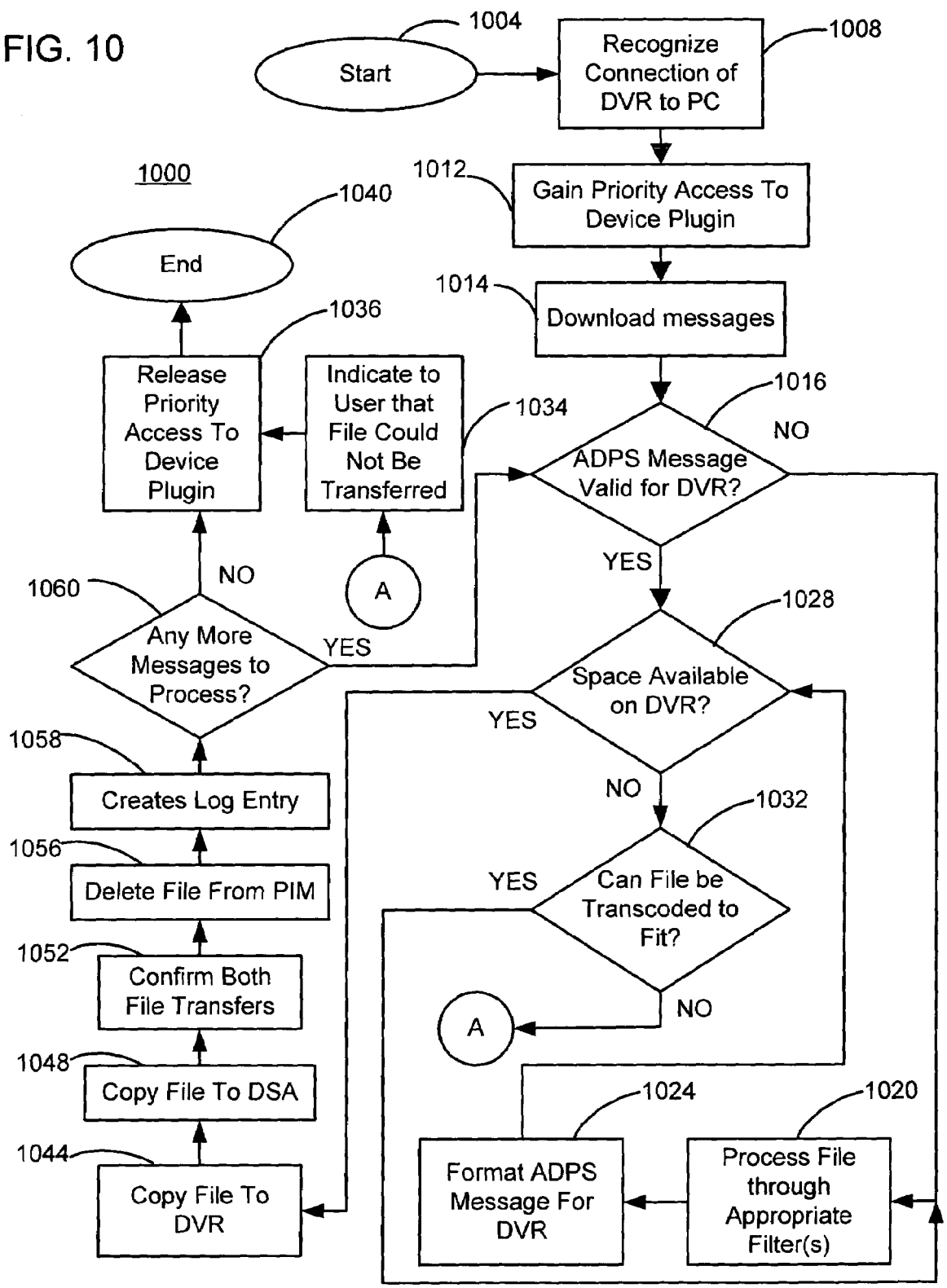
FIG. 10 is an ADPS Upload process consistent with certain embodiments of the present invention.

Turning now to FIG. 10, the process described above for automatic download may be modified to create an Automatic PIM-to-DVR Synchronization (ADPS) Upload process 1000 as shown. A user may desire to take files that have been created or stored on PC 112 with them on DVR 104 when they leave home or the office. The user may configure ADPS upload process 1000 in a variety of ways (eg. to transfer all email messages with audio content, all events, files of a certain date or time). The process starts at 1004. At 1008, the ADPS Upload process 1000 recognizes that a DVR 104 has been connected to PC 112. A Device Plugin that is resident on PC 112 controls access to DVR 104. At 1012, priority access to the Device Plugin is gained through a request/grant process.

When priority access to the Device Plugin is granted, ADPS download process 600, described above, executes at 1014 with a pass-through effect for blocks 612 and 620 related to Device Plugin access. When ADPS download process 600 completes, ADPS Upload process 1000 determines at 1016 whether a message in a source PIM is already validly formatted for DVR 104. All candidate files should comply with the audio Codec enabled on the DVR 104 when eventually downloaded. Files not complying may be transcoded to the appropriate codec. Files containing text may be handed over to a text to speech filter. As such, files may be transcoded or processed through a text to speech filter in order to be validly formatted for DVR 104. Based upon this teaching, it should now be apparent to those skilled in the art, that many other filters and conversions can be possible. These other possible filters are contemplated and considered consistent with this disclosure. Therefore, if the message for DVR 104 is not validly formatted at 1016, the file is processed through the appropriate filter(s) at 1020, as discussed above. The file is formatted properly for DVR 104 at 1024.

Memory space on DVR 104 is another consideration. One action that can be taken in case of limited DVR space can be an automatic transcoding of files to a lower bit-rate before upload. The transcode to a lower bit-rate process may also take place anytime that a file is uploaded from the PIM to the DVR 104. In case that the message contains text as well as audio information further processing may take place. For example, an email message containing audio and text information may be text-to-speech processed for the text portion, and then appended into one message file along with the audio recording. As another example, if space on DVR 104 is limited, a setup selection of upload by predetermined priority or exclusion of files larger than preset size may take place. An interface can include an indication to the user that the upload may not take place because of DVR 104 memory limitation.

At 1028 the space on DVR 104 is validated to determine if there is sufficient space for the file to be uploaded. If there is not sufficient space determined at 1028, the process determines whether the file can be transcoded to a lower bit rate to fit the available space at 1032. A minimal bit-rate for transcoding can be configured.

If it is determined that the file cannot be transcoded to fit the available space in DVR 104 at 1032, a notification is presented to the user at 1034 indicating that the file could not be transferred and the process releases priority access to the Device Plugin at 1036, and the process ends at 1040. If it is determined that the file can be transcoded to fit the available space in DVR 104, then the process transitions to 1020 to process the file. A formatting, as discussed above, is done at 1024, and the space is again validated at 1028.

In either case, if there is sufficient space determined at 1028 (either initially or after a transcoding), the file is copied to DVR 104 at 1044. The file is also copied to the DSA at 1048. Both file transfers are confirmed and acknowledged at 1052 and the file can be deleted from the PIM application at 1056 depending upon configuration. A log of the processing can be created at 1058, also depending upon configuration.

At 1060, the process determines whether there are any more messages in a PIM application that can be processed. If there are more messages in a PIM application to process, then a transition is made to 1016 to process the next message. If there are no more messages to process at 1060, the process transitions to 1036 to releases priority access to the Device Plugin and then ends at 1040.

Thus, the DVR 104 may be used for, in addition to downloading recorded ADPS messages 116 and standard audio recording, uploading PIM messages, uploading standard audio files, and uploading other audio information.

It may be desirable to distinguish between those messages uploaded from the PIM and other message types. In order to distinguish between these messages, the device may incorporate a graphical indication associated with files uploaded from the PIM. The special characteristics of files uploaded from the PIM may assist in playback selection. For example, email files associated with a certain email addressee may be played back sequentially upon selecting the addressee name on the DVR. Schedule files may prompt the user to play back according to message timing or may play back automatically when there is a date/time match with the DVR clock. To-do messages may be sorted and played back based on priority or completion date/time.

Automatic DVR to PIM download could take place in various other systems. Some commercially available PIM Synchronization Client software applications are able to connect to Web-based PIM. This allows such Web-based PIM to be accessed from any computer upon entering a user name and/or password. A Web-based PIM may store information on a remote server. Data access and management can usually be done via an Internet browser interface. Enabling compatibility with a Web-based PIM may employ a modified architecture for the FPF as well as a different type of PIM Synchronization Client to accommodate for data storage on a remote server.

The FPF can accommodate the possibility that a connection with the web based PIM is not established immediately. Most tasks of the FPF can still take place. However, since an immediate download of content and acknowledgment from the PIM Synchronization Client may not be available, a delayed activity may take place. Action such as removing a message from the DVR or flagging a file already downloaded to the PC may be postponed. A message that was not downloaded because of inability to access a remote server may be stored locally on a PC for a later download. Once the download takes place an acknowledgement can be sent by the PIM Synchronization Client to the FPF.

Some components of the PIM Synchronization Client may reside on the remote server. These components place the message in the appropriate storage place in the server. However, the components that directly communicate with the FPF have to reside on the PC where the FPF resides.

Further, in some cases it may be desired to download content to the PIM appropriate function without connecting to a PC at all. In those cases the PIM itself may still be accessible via a PC and may be interfaced either via a PIM software client or a Web-based interface. Similar to a Web-based PIM case, the design of the system can be adapted or modified in order to accommodate for delays and issues related to communication from the DVR to the PIM.

Figure 11:
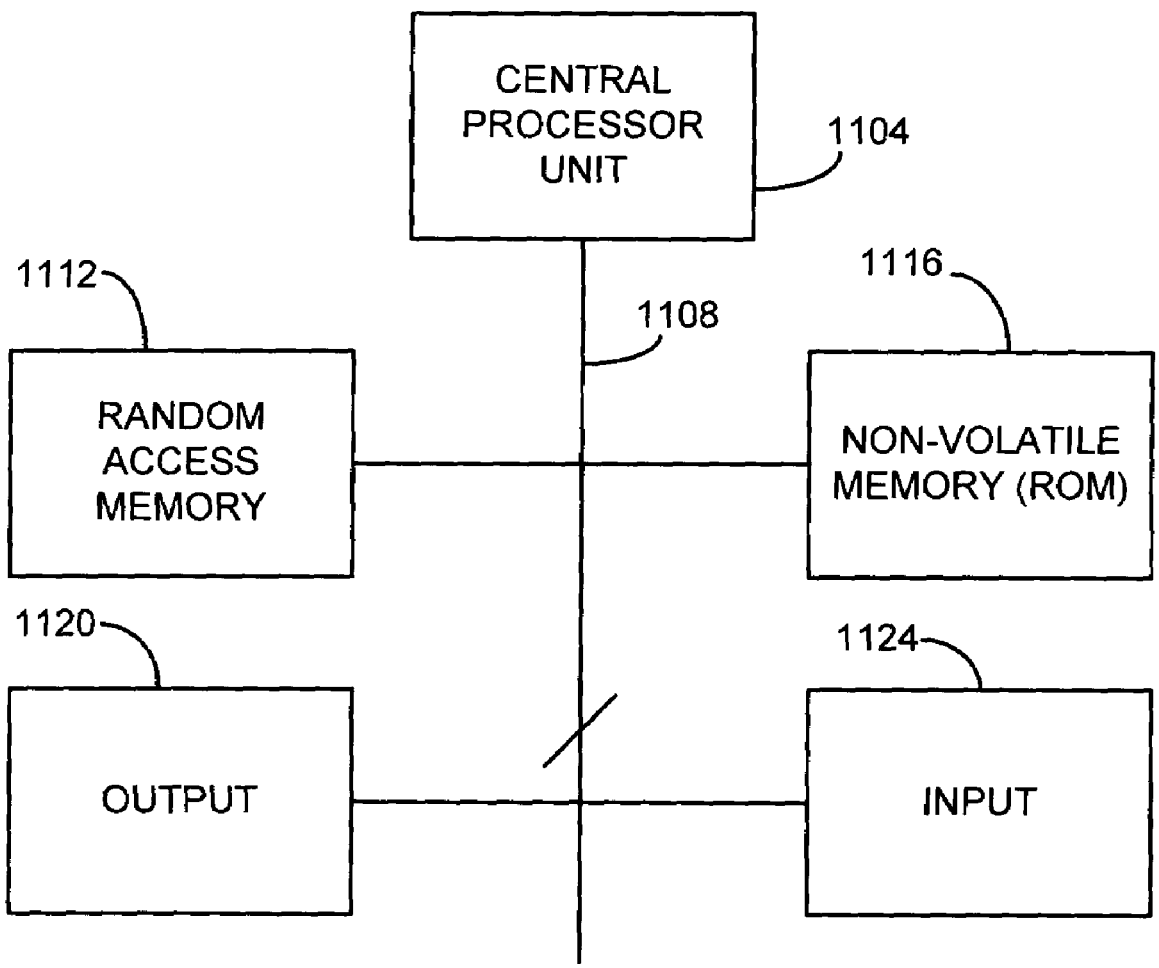
FIG. 11 is a block diagram of a DVR consistent with certain embodiments of the present invention.

Turning now to FIG. 11, an exemplary block diagram of a DVR 1100 capable of implementing the DVR-side ADPS methods discussed above is shown. DVR 1100 has a central processor unit (CPU) 1104 with an associated bus 1108 used to connect the central processor unit 1104 to Random Access Memory 1112 and/or Non-Volatile Memory 1116 in a known manner. An output mechanism at 1120 may be provided in order to connect to a computer of an APDS system. It should be noted that, in addition, DVR 1100 may incorporate a mechanism to directly communicate with a computer network such as the Internet, or a local or wide area network, without the need to connect directly to a computer. The communication can take place using a wired or wireless method. In these cases the DVR can download messages by use of a built in or external modem. External connection may be implemented by any connection device such as dedicated external modem, PDA with a built in modem, and a Cellular Phone with voice and data capabilities, along with many other methods. In all these cases, the system can maintain its functionality and may incorporate some of the remote functions such as those described above related to a Web-based PIM. In this type of implementation the FPF can reside on a remote computer or server. The DVR can be modified to enable communication with the remote FPF. Similarly, input devices such as a microphone and input select devices, or USB input 1124 may be provided for the input of information by the DVR 1100 user or from a personal computer. Further, a voice recognition capability can be added, as discussed above, in either a hardware or software embodiment, to enable voice command interpretation and recognition as a part of the input 1124 for use in a user interface of DVR 1100.

Figure 12:
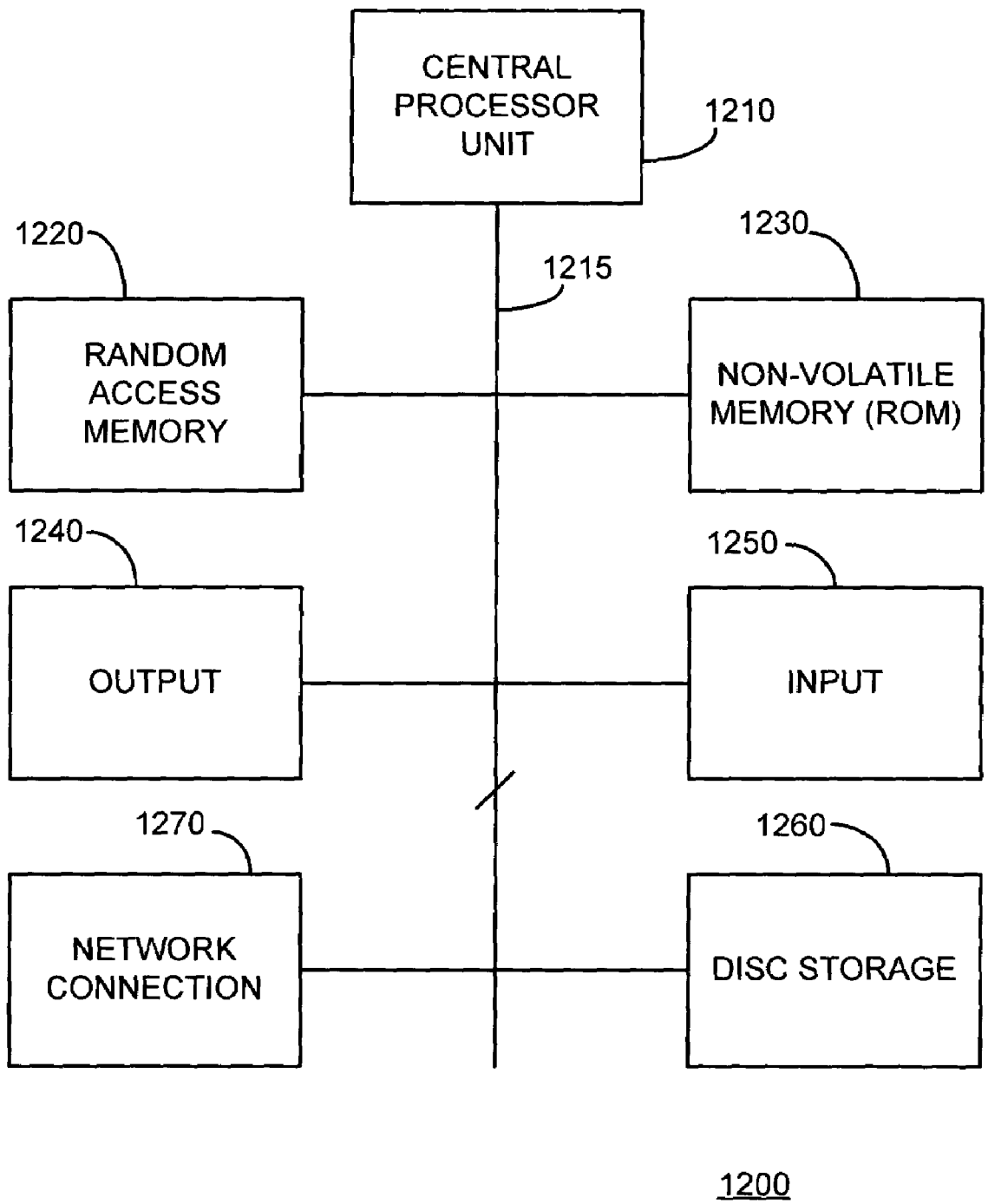
FIG. 12 is a block diagram of a computer consistent with certain embodiments of the present invention.

Turning now to FIG. 12, an exemplary block diagram of a computer system 1200 capable of implementing the PC-side ADPS methods discussed above is shown. Computer system 1200 has a central processor unit (CPU) 1210 with an associated bus 1215 used to connect the central processor unit 1210 to Random Access Memory 1220 and/or Non-Volatile Memory 1230 in a known manner. Computer system 1200 can perform such functions as controlling the ADPS processes described above, PIM application(s), file transfer, file enhancement filtering, formatting, logging, and other functions discussed above and contemplated by the above discussion. An output mechanism at 1240 may be provided in order to display and/or print output for the computer user and to interface to the DVR for ADPS synchronization by any of the methods discussed above. Similarly, input devices such as keyboard and mouse 1250 may be provided for the input of information by the computer user. Computer 1200 also may have disc storage 1260 for storing large amounts of information including, but not limited to, program files and data files. Computer system 1200 may be coupled to a local area network (LAN) and/or wide area network (WAN) and/or the Internet using a network connection 1270 such as an Ethernet adapter coupling computer system 1200, possibly through a firewall.

Those skilled in the art will recognize that certain of the exemplary embodiments described herein are based upon use of a programmed processor. However, the invention should not be so limited, since certain embodiments could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program actions and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

Certain embodiments as described herein, can be implemented using a programmed processor executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of Automated Digital voice recorder to Personal information manager Synchronization (ADPS), comprising:

receiving at least one voice file containing audio content and related descriptive information from a digital voice recorder (DVR);

reading information in the voice file that associates audio content within the voice file with a personal information manager (PIM) application;

processing the voice file by transferring the voice file to at least one PIM application; and processing the audio content through at least one enhancement filter to create at least one of enhanced audio and text content prior to transferring the voice file to a PIM application.

2. The method of claim 1, wherein the enhancement filter comprises at least one of a transcription filter, an enhanced audio filter, and a transcoding filter.

3. The method of claim 1, further comprising:
reformatting the voice file to interface the voice file with a PIM application thereby creating a reformatted voice file; and
wherein, the transferring comprises transferring the reformatted voice file to the at least one PIM application.

4. The method of claim 3, further comprising copying the reformatted voice file to a DVR Dedicated Software Application (DSA).

5. The method of claim 4, further comprising sending a command to the DVR instructing the DVR to delete the voice file from the DVR.

6. The method of claim 4, further comprising creating a log entry to record transferring the reformatted voice file to the PIM application and copying the reformatted voice file to the DVR Dedicated Software Application (DSA).

7. The method of claim 1, further comprising copying the voice file to a DVR Dedicated Software Application (DSA).

8. The method of claim 1, further comprising sending a command to the DVR instructing the DVR to delete the voice file from the DVR.

9. The method of claim 1, further comprising:
reformatting the voice file along with the at least one of enhanced audio content and text to interface the voice file with a PIM application thereby creating a reformatted voice file;
transferring the reformatted voice file to a PIM application;
copying the reformatted voice file to a DVR Dedicated Software Application (DSA);
deleting the voice file from the DVR; and
creating a log entry to record transferring the reformatted voice file to the PIM application and copying the reformatted voice file to the DVR Dedicated Software Application (DSA).

10. A method of Automated Digital voice recorder to Personal information manager Synchronization (ADPS), comprising:
retrieving at least one voice file from a Personal Information Manager (PIM) application wherein the voice file contains data plus information relating the data to the PIM;
if the data comprises text, processing the text by transforming the text to speech format; and
processing the voice file by transferring the voice file to a Digital Voice Recorder (DVR).

11. The method of claim 10, transforming the text to speech format by processing the text using a text-to-speech filter.

12. The method of claim 10, further comprising:
if the data comprises speech, determining if the data encoding complies with a format used on the DVR; and
converting the data to the format used on the DVR if the data is not encoded in the format used on the DVR prior to transferring the voice file to the DVR.

13. The method of claim 12, further comprising prior to transferring the voice file to the DVR:
determining whether the data encoding complies with a format used on the DVR;
processing the audio content through at least one filter to reformat the audio content to comply with a format used on the DVR;
determining whether the voice file will fit in available memory on the DVR;
transcoding the audio content of the voice file to a lower bit rate to allow it to fit in the available memory on the DVR;
copying the voice file to a DVR Dedicated Software Application (DSA); and
deleting the voice file from the PIM.

14. The method of claim 12, wherein converting the data comprises:
processing the audio content through at least one filter to reformat the audio content to comply with a format used on the DVR and to create a reformatted audio content; and
replacing the audio content in the voice file with the reformatted audio content prior to transferring the voice file to the DVR.

15. The method of claim 14, wherein the filter comprises a transcoder filter.

16. The method of claim 10 further comprising determining whether the voice file will fit in available memory on the DVR prior to transferring the voice file to the DVR.

17. The method of claim 16 further comprising:
transcoding the audio content of the voice file to a lower bit rate to allow it to fit in the available memory on the DVR to create a transcoded audio content prior to transferring the voice file to the DVR; and
replacing the audio content in the voice file with the transcoded audio content prior to transferring the voice file to the DVR.

18. The method of claim 10, further comprising copying the voice file to a DVR Dedicated Software Application (DSA).

19. The method of claim 18, further comprising deleting the voice file from the PIM.

20. A computer readable medium storing instructions which, when executed on a programmed processor, carry out the process of:
receiving at least one voice file from a Personal Information Manager (PIM) application wherein the voice file contains data plus information relating the data to the PIM;
if the data comprises text, processing the text by transforming the text to speech format; and
processing the voice file by transferring the voice file to a Digital Voice Recorder (DVR).

21. The computer readable medium of claim 20, further storing instructions which, when executed on a programmed processor, carry out a process of;
determining whether the data encoding within the voice file complies with a format used on a DVR prior to transferring the voice file to the DVR; and
if the encoding of the data does not comply with a format used on the DVR:
processing the data through at least one filter to reformat the data to comply with a format used on the DVR and to create reformatted data; and
replacing the data in the voice file with the reformatted data prior to transferring the voice file to the DVR.

22. The computer readable medium of claim 21, wherein the filter comprises at least one of a transcoder filter and a text-to-speech filter.

23. The computer readable medium of claim 20, further storing instructions which, when executed on a programmed processor, carry out a process of
  determining whether the voice file will fit in available memory on the DVR prior to transferring the voice file to the DVR; and
  if the voice file will not fit in available memory on the DVR:
    transcoding audio content forming a part of the data of the voice file to a lower bit rate to allow the voice file to fit in the available memory on the DVR and to create a transcoded data; and
    replacing the data in the voice file with the transcoded audio content prior to transferring the voice file to the DVR.

24. The computer readable medium of claim 20, further storing instructions which, when executed on a programmed processor, carry out a process of copying the voice file to a DVR Dedicated Software Application (DSA).

25. The computer readable medium of claim 24, further storing instructions which, when executed on a programmed processor, carry out a process of deleting the voice file from the PIM.

26. An apparatus for Automated Digital voice recorder to Personal information manager Synchronization (ADPS), comprising:
  an interface that enables file transfer to a Digital Voice Recorder (DVR);
  a programmed processor that transfers at least one voice file containing audio content and related information from a Personal Information Manager (PIM) application across the interface to the DVR;
  wherein the programmed processor further;
  determines whether encoding of the audio content within the voice file complies with a format used on the DVR prior to transferring the voice file to the DVR; and
  if the encoding of the audio content does not comply with a format used on the DVR:
    processes the audio content through at least one filter to reformat the audio content to comply with a format used on the DVR and to create a reformatted audio content; and
    replaces the data in the voice file with the reformatted audio content prior to transferring the voice file to the DVR.

27. The apparatus of claim 26, wherein the filter comprises at least one of a transcoder filter and a text-to-speech filter.

28. The apparatus of claim 26, wherein the programmed processor further:
  determines whether the voice file will fit in available memory on the DVR prior to transferring the voice file to the DVR; and
  if the voice file will not fit in available memory on the DVR:
    transcodes the audio content of the voice file to a lower bit rate to allow it to fit in the available memory on the DVR to create a transcoded audio content; and
    replaces the audio content in the voice file with the transcoded audio content prior to transferring the voice file to the DVR.

29. The apparatus of claim 26, wherein the programmed processor further copies the voice file to a DVR Dedicated Software Application (DSA).

30. The apparatus of claim 29, wherein the programmed processor further deletes the voice file from the PIM.

31. A method of Automated Digital voice recorder to Personal information manager Synchronization (ADPS) message creation comprising:
  receiving a signal from a user interface that an ADPS message is to be created;
  receiving an ADPS type selection relating the ADPS message to be created to a type of Personal Information Manager (PIM) application;
  receiving a start command signal from the user interface to begin recording audio content for the ADPS message to be created;
  receiving a stop command signal from the user interface to stop recording the audio content for the ADPS message to be created; and
  creating an ADPS message by organizing the ADPS type selection and the audio content into the ADPS message.

32. The method of claim 31, further comprising receiving information related to the ADPS type selection.

33. The method of claim 32, wherein the type of PIM application comprises one of an email PIM application, a schedule PIM application, and a task manager PIM application, a time management PIM application, a responsibility tracking PIM application, an address management PIM application, a to-do list PIM application, and a calendar PIM application.

34. The method of claim 33, wherein an order of presenting the application type to a user is varied according to a command that reorders the list of PIM applications.

35. The method of claim 33, wherein a list of possible addressees for an ADPS message is received.

36. The method of claim 35, wherein if the type of PIM application is the email PIM application, a user is presented with the list of possible addressees to receive the email and can select at least one of the addressees as part of the information related to the ADPS type selection.

37. The method of claim 34 wherein the information related to the ADPS type selection comprises at least one of a date for an event, a time for the event, a date for the event to start, a date for the event to stop, a time for the event to start, a time for the event to stop, a priority for the event, and an addressee for the ADPS message.

38. The method of claim 32, further comprising organizing the information related to the ADPS type selection with the ADPS type selection and the audio content to create an ADPS message.

39. The method of claim 32, wherein creating the ADPS message comprises:
  storing the ADPS type selection to form an ADPS header; and
  storing the audio content with the ADPS header to form the ADPS message.

40. The method of claim 32, wherein creating the ADPS message comprises:
  storing an indicating of an ADPS message;
  storing the ADPS type selection;
  storing the information related to the ADPS type selection with the indication of the ADPS message and the ADPS type selection to form an ADPS header; and
  storing the audio content with the ADPS header to form the ADPS message.

41. The method of claim 32, wherein creating the ADPS message comprises:
  storing the ADPS type selection;
  storing the information related to the ADPS type selection with the ADPS type selection to form an ADPS header; and storing the audio content with the ADPS header to form the ADPS message.

42. The method of claim 31, further comprising receiving a computer identifier selection to identify a computer to synchronize with.

43. The method of claim 42, wherein the computer identifier selection comprises at least one of a business computer and a personal computer.

44. The method of claim 31, wherein a list of possible computers to synchronize with is received.

45. The method of claim 44, wherein a user is presented with the list of possible computers to synchronize with and can select at least one of the computers as the computer to synchronize with.

46. A computer readable medium storing instructions which, when executed on a programmed processor, carry out the process of:
receiving a signal from a user interface that an ADPS message is to be created;
receiving an ADPS type selection relating the ADPS message to be created to a type of Personal Information Manager (PIM) application;
receiving a start command signal from the user interface to begin recording audio content for the ADPS message to be created;
receiving a stop command signal from the user interface to stop recording the audio content for the ADPS message to be created; and
creating an ADPS message by organizing the ADPS type selection and the audio content into the ADPS message.

47. An apparatus for Automated Digital voice recorder to Personal information manager Synchronization (ADPS) message creation comprising:
a microphone;
an analog to digital converter that converts analog microphone input signals to audio content in a digital format;
a memory;
a user interface; and
a programmed processor that receives an indication that an ADPS message is to be created, an ADPS type selection relating the ADPS message to be created to a type of Personal Information Manager (PIM) application, a start signal to begin recording audio content for the ADPS message to be created, and a stop signal to stop recording the audio content for the ADPS message to be created from the user interface; and that creates an ADPS message by organizing the ADPS type selection and the audio content into the ADPS message and storing the ADPS message in the memory.

48. The apparatus of claim 47, wherein the type of PIM application comprises one of an email PIM application, a schedule PIM application, and a task manager PIM application, a time management PIM application, a responsibility tracking PIM application, an address management PIM application, a to-do list PIM application, and a calendar PIM application.

49. The apparatus of claim 47, wherein the programmed processor further receives information related to the ADPS type selection.

50. The apparatus of claim 49 wherein the information related to the ADPS type selection comprises at least one of a date for an event, and a time for the event, a date for the event to start, a date for the event to stop, a time for the event to start, a time for the event to stop, a priority for the event, and an addressee for the ADPS message.

51. The apparatus of claim 49, wherein the programmed processor further organizes the information related to the ADPS type selection with the ADPS type selection and the audio content to create an ADPS message.

52. The apparatus of claim 47, wherein to create the ADPS message, the programmed processor further:
stores the ADPS type selection in the memory to form an ADPS header; and
stores the audio content with the ADPS header in the memory to form the ADPS message.

53. The apparatus of claim 49, wherein to create the ADPS message, the programmed processor further:
stores the indicating of the ADPS message received from the user interface in the memory;
stores the ADPS type selection in the memory;
stores the information related to the ADPS type selection with the indication of the ADPS message and the ADPS type selection in the memory to form an ADPS header; and
stores the audio content with the ADPS header in the memory to form the ADPS message.

54. The apparatus of claim 49, wherein to create the ADPS message, the programmed processor further:
stores the ADPS type selection in the memory;
stores the information related to the ADPS type selection with the ADPS type selection in the memory to form an ADPS header; and
stores the audio content with the ADPS header in the memory to form the ADPS message.

55. The apparatus of claim 47, wherein the analog to digital converter further converts spoken commands into a digital format as part of the user interface and wherein the apparatus further comprises a voice recognition unit that can interpret the spoken commands and generate the indications, selections, and signals received by the programmed processor during ADPS message creation.

56. The apparatus of claim 49, wherein the analog to digital converter further converts spoken commands into a digital format as part of the user interface and wherein the apparatus further comprises a voice recognition unit that can interpret the spoken commands and generate the indications, selections, signals, and information related to the ADPS type selection received by the programmed processor during ADPS message creation.

57. The apparatus of claim 47, wherein the programmed processor receives a computer identifier selection to identify a computer to synchronize with.

58. The apparatus of claim 57, wherein the computer identifier selection comprises at least one of a business computer and a personal computer.

59. The apparatus of claim 47, wherein the programmed processor receives a list of possible computers to synchronize with.

60. The apparatus of claim 59, wherein a user is presented with the list of possible computers to synchronize with and can select at least one of the computers as the computer to synchronize with.

61. A computer readable storage medium storing data for communication between a Digital Voice Recorder (DVR) and a host computer, comprising:
a segment of audio content representing a digital voice message;
a header containing information that defines an association between the digital voice message and a personal information manager (PIM); and
wherein the header contains a message type field that determines if the digital voice message is an ADPS (Automated Digital voice recorder to Personal information manager Synchronization message or a non- ADPS message, wherein ADPS messages have an association with a PIM program.

62. The computer readable storage medium according to claim 61, wherein, if the digital voice message is designated as an ADPS message, the header contains an ADPS type field that determines a specific PIM program associated with the digital voice message.

63. The computer readable storage medium according to claim 62, wherein the specific PIM program comprises at least one of an email program, a schedule program, a task manager program, time management, responsibility tracking, address management, to-do list, and a calendar program.

64. The computer readable storage medium according to claim 62, further comprising at least one parameter field containing parameters associated with the specific PIM program.

65. The computer readable storage medium according to claim 61, wherein the header contains a log field that identifies logged events associated with the digital voice message.

66. The computer readable storage medium according to claim 61, wherein the data stored on the storage medium is carried from the DVR to the host over a communication interface.

67. The computer readable storage medium according to claim 66, wherein the communication interface comprises one of a universal serial bus (USB) interface, a serial interface, a parallel interface, an IEEE-1394 compliant interface, an infrared interface, an Ethernet interface, and a wireless interface.

68. An apparatus for Automated Digital voice recorder to Personal information manager Synchronization (ADPS), comprising:
  means for receiving at least one voice file containing audio content and related information from a digital voice recorder (DVR);
  means for reading information in the voice file that associates audio content within the voice file with a personal information manager (PIM) application;
  means for processing the voice file by transferring the voice file to at least one PIM application; and
  means for processing the audio content using at least one enhancement filter to create enhanced audio content prior to transferring the voice file to a PIM application and wherein the enhancement filter comprises at least one of a transcription filter, an enhanced audio filter, and a transcoding filter.

69. The apparatus of claim 68, further comprising means for storing the voice file in a memory.

70. The apparatus of claim 69, further comprising means for creating a log entry to record transferring the voice file to the PIM application.

71. An apparatus for Automated Digital voice recorder to Personal information manager Synchronization (ADPS) message creation comprising:
  means for receiving an analog audio signal;
  means for converting the analog audio signal into audio content in a digital format;
  means for receiving an indication that an ADPS message is to be created;
  means for receiving an ADPS type selection relating the ADPS message to be created to a type of Personal Information Manager (PIM) application;
  means for receiving a start signal to begin recording audio content for the ADPS message to be created;
  means for receiving a stop signal to stop recording the audio content for the ADPS message to be created; and
  means for creating an ADPS message by organizing the ADPS type selection and the audio content into the ADPS message and storing the ADPS message in a memory.

72. The apparatus of claim 71, wherein the type of PIM application comprises one of an email PIM application, a schedule PIM application, and a task manager PIM application, a time management PIM application, a responsibility tracking PIM application, an address management PIM application, a to-do list PIM application, and a calendar PIM application.

73. The apparatus of claim 71, wherein the programmed processor further receives information related to the ADPS type selection and wherein the information related to the ADPS type selection comprises at least one of a date for an event, and a time for the event, a date for the event to start, a date for the event to stop, a time for the event to start, a time for the event to stop, a priority for the event, and an addressee for the ADPS message.

74. The apparatus of claim 71, further comprising means for voice recognition that can interpret spoken commands and generate the indications, selections, and signals during ADPS message creation.

75. The apparatus of claim 71, further comprising means for voice recognition that can interpret spoken commands and generate the indications, selections, signals, and information related to the ADPS type selection received during ADPS message creation.

* * * * *